United States Patent [19]

Bayless et al.

[11] 4,002,802

[45] Jan. 11, 1977

[54] PHOTOGRAPHIC SUBBING COMPOSITION HAVING IMPROVED ANCHORAGE

[75] Inventors: John H. Bayless, Kendall Park; Harold Carl Arvidson, Princeton Junction, both of N.J.

[73] Assignee: E. I. Du Pont de Nemours and Company, Wilmington, Del.

[22] Filed: Sept. 12, 1975

[21] Appl. No.: 612,729

[52] U.S. Cl. .............................. 428/483; 427/385 B; 428/910
[51] Int. Cl.² ..................... B05D 3/00; B32B 27/08; B32B 27/30; B32B 27/36
[58] Field of Search ........... 427/171, 385; 428/483, 428/910; 96/87

[56] References Cited

UNITED STATES PATENTS

| | | | |
|---|---|---|---|
| 2,779,684 | 1/1957 | Alles | 428/483 |
| 3,443,950 | 5/1969 | Rawlins | 96/87 R |
| 3,460,944 | 8/1969 | Cohen | 96/87 R |
| 3,545,972 | 12/1970 | D'Cruz | 96/87 R |
| 3,567,452 | 3/1971 | Rawlins | 96/87 R |

*Primary Examiner*—James R. Hoffman

[57] ABSTRACT

Conventional adhesive substratum compositions (e.g. subbing compositions of, for example, aqueous emulsions of a polymerized vinylidene chloride/methyl acrylate/itaconic acid terpolymer) can be used for coating dimensionally stable, hydrophobic macromolecular film bases (e.g. polyethylene terephthalate) after said base has been biaxially stretched by treating said subbing composition with an ion exchange resin.

10 Claims, No Drawings

PHOTOGRAPHIC SUBBING COMPOSITION HAVING IMPROVED ANCHORAGE

BACKGROUND OF THE INVENTION

1. Field of the Invention

This invention relates to adhesive substratum compositions (e.g. subbing compositions) for coating hydrophobic, macromolecular film bases. More particularly, this invention relates to subbing compositions which can be applied to said film base after the base has been biaxially stretched. Still more particularly, this invention relates to subbing systems having greatly improved anchorage to subsequently applied hydrophilic layers when applied after stretching.

2. Description of the Prior Art

During the manufacture of coated films (e.g. particularly photographic films) it is conventional to coat the hydrophobic, macromolecular elements used for the film support with a subbing composition which will provide anchorage for subsequently applied hydrophilic coatings (e.g. gelatin and gelatino silver halide emulsions). The prior art describes numerous elements which are useful as this primary subbing composition. Alles et al., U.S. Pat. Nos. 2,627,088 and 2,698,240 and Swindells, U.S. Pat. No. 2,698,235 disclose products and processes which embody the use of vinylidene chloride copolymers and particularly a terpolymer of vinylidene chloride with acrylic esters and itaconic acids which are eminently suitable as the primary subbing layer on said hydrophobic film supports.

Cohen, U.S. Pat. No. 3,460,944 filed Mar. 18, 1965 describes a method of further improving the anchorage of the subbing layers described above by mixing the primary composition terpolymer with an alkyl acrylate or alkyl methacrylate polymer. Further improvements in anchorage and a reduction in repellency spots and masking of scratches was obtained by polymerizing the alkyl acrylate or alkyl methacrylate directly in the aqueous dispersion of the terpolymer as taught, for example by Rawlins in U.S. Pat. Nos. 3,443,950, May 13, 1969 and 3,567,452, Mar. 2, 1971. These subbing compositions are conventionally applied from an aqueous dispersion on to cast polyethylene terephthalate films prior to a biaxial stretching of the film which results in biaxial orientation. During the continuous processing of a web, it is not uncommon for tears to occur for various reasons, such as imperfections in the cast film, misalignment of equipment, failure to maintain proper operating conditions, etc. These tears are most likely to occur during the biaxial stretching and heat setting step after the polymer is cast into film and coated with the subbing composition. Because of the presence of the subbing composition adhered thereto, it is difficult to recycle scrap film made in this manner due to arduous procedures necessary to remove the dried sub-layer. Numerous attempts have been made to coat these subbing compositions on the film support after the biaxial stretching and heat setting step but in all cases, the adherence of a subsequently applied water permeable colloid layer, e.g. gelatin is greatly lessened. D'Cruz in U.S. Pat. No. 3,545,972, Dec. 8, 1970 describes a subbing system which can be applied to a hydrophobic film base after biaxial stretching. However, this system requires that the film base be additionally treated with electrical discharge, flame treatment, surface oxidation, UV light exposure and the like.

SUMMARY OF THE INVENTION

It is an object of this invention to provide subbing compositions for coating dimensionally stable, hydrophobic, macromolecular film supports. A further object is to provide said improved subbing composition so that it may be applied to the film support after biaxial stretching thereof without further treatment of the base (e.g. surface treatment). A still further object is to provide a film support coated with said improved subbing composition showing improved anchorage when other hydrophilic layers are coated thereon. Still another object is to provide an improved subbed film support particularly useful in coating photographic elements (e.g. gelatino silver halide emulsions).

These and other objects are achieved by treating any emulsion polymerizable subbing system for hydrophobic film supports with an ion exchange resin prior to applying said subbing system to said hydrophobic support. Preferably, anionic exchange resins are used, although excellent results may be achieved by treatment with a cationic resin followed by treatment with an anionic resin.

DESCRIPTION OF THE PREFERRED EMBODIMENTS

Emulsion polymers and copolymers useful in preparing subbing layers for coating on hydrophobic film supports are legion in number. Generally the emulsion polymer will contain from 35 to 96 weight percent vinylidene chloride, from 3.5 to 64.5 weight percent of an alkyl acrylate wherein the alkyl group contains from 1 to 10 carbon atoms or an alkyl methacrylate wherein the alkyl group contains from 1 to 10 carbon atoms, acrylonitrile, methacrylonitrile and vinyl chloride or combinations thereof, and from 0.5 to 25 weight percent of a carboxylic acid containing from 3 to 10 carbon atoms and having one carbon - carbon ethylenically unsaturated double bond.

The tricomponent copolymers of Swindels, U.S. Pat. No. 2,698,235, 12/28/54 and further exemplified by Alles et al in U.S. Pat. No. 2,698,240, 12/28/54 are useful herein. Particularly useful are the sequentially polymerized elements of Rawlins, U.S. Pat. No. 3,443,950, 8/13/69 and U.S. Pat. No. 3,567,452, 3/2/71. These elements consist of a sequentially polymerized mixture of (a) terpolymer of vinylidene chloride/alkyl acryate/itaconic acid wherein the alkyl group contains 1–4 carbon atoms and said components are present in the respective amounts of weight of 35 to 96%, 3.4 to 64.5% and 0.5 to 25%, and (b) a polymer, i.e. homopolymer or copolymer, of an acrylate ester selected from the group consisting of (1) alkyl acrylates wherein the alkyl radical contains 1 to 10 carbon atoms, and (2) alkyl methacrylates wherein the alkyl radical contains 1 to 10 carbon atoms, polymerized in an aqueous dispersion of (a), above, wherein thhe terpolymer (a) and polymer (b) are in the respective amounts by weight of 90 to 60% and 10 to 40%. A particularly preferred composition is 75 parts of the terpolymer 90 vinylidene chloride/10 methyl acrylate/2 itaconic acid sequentially polymerized with 25 parts of ethyl acrylate. Compositions of this type are usually formed by dispersing the terpolymer (a), the monomer of ethylacrylate (b), an addition polymerization initiator and a dispersing agent in water and polymerizing the monomer (b) in situ. The resulting emulsion dispersion in then treated with an anionic exchange resin and is then suitable for coating a dimensionally stable, hydrophobic, macromolecular film base after said film base has undergone biaxial stretching. Elements prepared in this manner exhibit remarkable adhesion to the film base as well as to any subsequently applied hydrophilic layers. In comparison, an emulsion polymer prepared in the same manner, but without subsequent treatment with an anionic ion exchange resin when applied to the film base after biaxial stretching, exhibits poor adhesion to subsequently applied hydrophilic layers. Additionally, our novel system does not require that the film base receive additional surface treatment such as by flame, electrical discharge and the like, which adds further expense in equipment and operation, and hence our system provides a clear improvement over the prior art. The means for applying subbing compositions of the types described above are disclosed in Alles et al., U.S. Pat. No. 2,627,088, 2/3/53.

In yet another embodiment, the emulsion polymer may be first treated with a cationic exchange resin followed by further treatment with an anionic exchange resin before coating on the biaxially stretched film support. In this case, the system also exhibits improved adhesion over one where the emulsion polymer has not been treated with an ion exchange resin. However, this system requires two treatment steps and therefore, because of additional cost, is not preferred over that using a single ion exchange step.

There are numerous ion exchange resin types which will function within this invention. Included, for example, are the resins disclosed by Salmon and Hale in "Ion Exchange — A Laboratory Manual," The Academic Press, Inc., Publishers (1959) among others. Ion exchange resins are regarded as insoluble acids or bases which can form insoluble salts and are comprised of a cross-linked polymer network to which are attached ionized or ionizable salts. The resins swell in an aqueous medium but cross-linking of the polymer chains prevents dissolution. The aqueous solution of the material to be treated with the ion exchange resin diffuses through the swollen resin and exchanges with an ion of like charge in the surrounding solution. Cation — exchange resins contain acidic groups (e.g. $-SO_3H$, $-CO_2H$, phenolic -OH groups and the like) as described by Jaeger, et al. in U.S. Pat. No. 2,204,539, 6/11/40, for example, while anion exchange resins contain basic groups (e.g. $-N(CH_3)_3-OH$, $-NH_2$, $-NH.CH_3$ and the like) as described by Cheethan et al. in U.S. Pat. No. 2,341,907, 2/15/44, for example. The resins can be classified as strongly or weakly acidic or basic depending on the nature of the groups pendant from the cross-linked resin.

Within this invention, we prefer to use weakly basic ion exchange resins, although any strength base resin will function. Acidic, or cationic, — exchange resins in and by themselves will not produce the novel effects noted herein. On the other hand, if one treats the emulsion polymers useful as subbing layers as described, with an anionic exchange resin after treatment with a cationic exchange resin even better results are achieved as regards subbing anchorage. A particularly useful resin for this invention is a gel type, weakly basic anion exchange resin possessing tertiary amine functionalities on a cross-linked acrylic matrix.

In practicing this invention one merely selects an emulsion polymer of the prior art useful as an anchoring substratum for a hydrophobic macromolecular, dimensionally stable film support and treats the aqueous emulsion with an anionic exchange resin. This treatment may be accomplished by passing the aqueous emulsion containing from about 1 to 30 weight percent of the emulsion polymer through a column containing a bed of the activated resin or simply by slurrying the activated resin with the emulsion followed by filtration. Below about 1 weight percent solids the amount of material being ion exchanged becomes excessive for the amount of solids being treated. Above about a 30 weight percent solids content the material becomes viscous and difficult to process through the ion exchanger. The resin, after ion exchanging, differs in two measurable physical properties from the non-ion exchanged resin. First, the surface tension of the emulsion changes from about 30 to 40 dynes per cm to about 50 to 60 dynes per cm. Second, the pH of the emulsion changes from about 2 to 5 and usually about 2.5 to above 7.5 with ion exchange treatment. The pH of the subbing composition, which has been increased by said treatment, may be adjusted to the acid side (e.g. pH 3-4) with, for example, an organic acid (e.g. malonic) to stabilize the emulsion and prevent decomposition. This subbing composition is now suitable for coating biaxially stretched, dimensionally stable polyethylene terephthalate, for example, and this improved subbing composition will exhibit excellent adhesion to both the polyethylene terephthalate and to subsequently applied hydrophilic layers (e.g. gelatin or gelatin containing emulsions). On the other hand, the same subbing composition not treated in the manner of this invention, will not exhibit good adhesion to a subsequently applied hydrophilic layer and thus is unsuitable for use as a primary subbing layer. This fact is surprising since the only measured physical changes in the treated emulsion polymers are the pH and the surface tension and these changes alone will not account for improved anchorage or adhesion. Thus it is not obvious to arrive at our invention from a knowledge of the prior subbing art, the resin treatment field or any simple measurement of system parameters known.

The subbing compositions of this invention may be applied to any support surface where it is necessary to achieve adhesion between the support and another applied layer which is not in and of itself compatible with the nature of the support surfaces. Generally the subbing compositions are coated on the support at a thickness corresponsing to ½ to 5mg. per $dm^2$. Particularly useful supports are the hydrophobic, macromolecular polymer elements which can be cast as films and must be biaxially stretched and heat relaxed to achieve dimensional stablility. The films formed from the polyesterification product of a dicarboxylic acid and a dihydric alcohol according to the teachings of Alles, U.S. Pat. No. 2,779,684 and the patents cited in that specification are particularly useful. Other suitable supports include the polyethylene terephthalate/isophthalate of British Patent 766,290 and Canadian Patent 562,672 and those obtained by condensing terephthalic acid or dimethyl terephthalate with propylene glycol, diethylene glycol, tetramethylene glycol or cyclohexane 1,4-dimethanol (hexahydro-p-exylene alcohol). The films of Bauer et al. U.S. Pat. No. 3,052,543, Sept. 4, 1962 may also be used. These polyester films are particularly suitable because of their dimensional stability. Generally polyesters are the preferred supports. Such polyesters contain repeating units of the structure

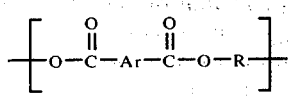

wherein R is an alkylene group of from 2 to 10 carbon atoms, a cycloalkylene group of from 6 to 10 carbon atoms, or an arylene group of from 6 to 20 carbon atoms; and Ar is either phenylene or naphthylene. Preferred alkylene groups are ethylene and n-butylene 1,4. The preferred cycloalkylene group is

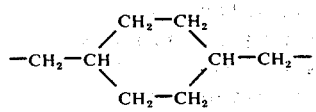

The preferred aromatic group is

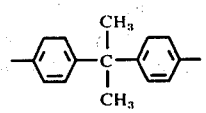

Preferred Ar groups are phenylene-1,4; phenylene-1,3; and naphthalene-2,6. Generally the polyester will be biaxially oriented such as by stretching in a tenter frame. The amount of stretching is generally from 1.5 to 5X in both the machine direction and in the transverse direction. Various stretching temperatures may be used but for polyethylene terephthalate 100°–105° C. is particularly satisfactory in reducing tears while achieving the desired result. Heat setting is used to improve the dimensional stability of the film. For polyethylene terephthalate 115° to 150° C. while under tension to prevent heat relaxation of more than a few percent is suitable. Generally the polyester substrates will have a melting point of from 150° to 300° C.

In addition, the ion-exchange treated, sequentially polymerized subbing compositions of this invention may also be applied to paper or cloth supports as well as the cellulosic elements (e.g. cellulose acetate, triacetate, acetate butyrate, etc.) and the polymerized vinyl supports (e.g. copolymerized vinyl acetate, chloride, etc.). Polystyrene and polymerized acrylates may also be used as supports within the scope of this invention.

This invention will now be illustrated by, but not limited to, the following examples:

EXAMPLE 1

An aqueous coating composition comprised of a sequentially polymerized mixture of:

a. 75% by weight of vinylidene chloride/methyl acrylate/itaconic acid terpolymer in the respective amounts by weight of 85/15/2, and b. 25% by weight a polymer of ethyl acrylate formed by addition polymerization in the presence of said terpolymer was prepared by the methods described in Rawlins, U.S. Pat. No. 3,443,950, May 13, 1969. The resulting dispersion contained 12.5% solids, had a pH of 3.25 and a surface tension of 38.9 dynes/cm. This material was treated by slurrying for 2 hours in an amine based intermediate basic ion exchange resin from the Barnstead Corp., Boston, Mass (No. 31002). The resin was first activated by slurrying with a 5% NaOH solution followed by washing with distilled water to remove the excess NaOH. The coating composition was removed from the ion exchange resin by filtering. The surface tension of the resin treated material had risen to 54.4 dynes/cm. and the pH to 6.78. The emulsion thus produced was coated on a biaxially oriented and heat set polyethylene terephthalate film support and further overcoated with a thin substratum of gelatin as taught by Rawlins in U.S. Pat. No. 3,443,950, 3/13/69. After coating this doubly subbed film support was heat relaxed at 135° C. for about 2 minutes and then coated with a standard photographic gelatino silver halide emulsion. A control was also prepared from a subbing composition similar to that described above but without the ion exchange treatment. Both samples were given a test exposure followed by development in a standard developer solution for said silver halide element. Wet and dry anchorage of these materials were tested according to the procedures of D'Cruz, U.S. Pat. No. 3,545,972, 12/8/70 and the following results were obtained:

| Sample | Anchorage[1] Wet |
|---|---|
| Control | 6 |
| After ion-exch. treatment | 2–3 |

[1]Where "0" is excellent and "6" describes complete anchorage failure. The photographic sensitometry of the ion-exchange treated material was equivalent in all respects to a control containing the same emulsion coated thereon.

EXAMPLE 2

An aqueous coating composition comprised of vinylidene chloride/methyl acrylate/itaconic acid in the respective amounts by weight of 90/10/2 was prepared in the manner described by Swindells, U.S. Pat. No. 2,698,235, 12/28/54. This material, after dilution to 12-1/2% solids, had a pH of 3.0 and the surface tension was 40.2 dynes/cm. This material was passed through a 1 cubic foot glass column packed with a gel-type, weakly basic anion exchange resin having tertiary amine functionalities on a cross-linked acrylic matrix (Amberlite IRA-68, Rohm and Haas Co., Philadelphia, Pa.) at a rate of 500cc/22 minutes. The surface tension had risen to 54.2 dynes/cm and the pH to 7.8 following this treatment. The solution was adjusted to 2–½% solids by dilution with water, the pH adjusted to 4.0 by adding malonic acid, and the surface tension adjusted to 39.8 dynes/cm by adding a wetting agent (sodium myristyl ether sulfate, an anionic surfactant termed Standapol ES-40, produced by Standard Chemical Products, Inc., 10% aqueous solution). The dispersion thus produced was coated on a polyethylene terephthalate film support and further overcoated with a thin substratum of gelatin as taught by Rawlins in U.S. Pat. No. 3,443,950, 3/13/69. After coating this doubly subbed film support was heat relaxed at 130° C. for about 2 minutes and then coated with a standard photographic gelatino silver halide emulsion. A control was also prepared from a subbing composition similar to that described above but without the ion exchange treatment. Both samples were given a test exposure followed by development in a standard developer solution for said silver halide element. Wet and dry anchorage of these materials were tested according to the procedures of D'Cruz, U.S. Pat. No. 3,545,972, 12/8/70 and the following results were obtained:

| Sample | Anchorage[1] | |
|---|---|---|
| | Wet | Dry |
| Control | 6 | 0 |
| After ion-exch. treatment | 0–1 | 0 |

[1]Where "0" is excellent and "6" describes complete anchorage failure. The photographic sensitometry of the ion-exchange treated material was equivalent in all respects to a control containing the same emulsion coated thereon.

EXAMPLE 3

An aqueous coating composition comprised of a sequentially polymerized mixture of:

a. 75% by weight of vinylidene chloride/methyl acrylate/itaconic acid terpolymer in the respective amounts by weight of 85/15/2, and b. 25% by weight a polymer of ethyl acrylate formed by addition polymerization in the presence of said terpolymer was prepared by the methods described in Rawlins, U.S. Pat. No. 3,443,950, May 13, 1969. The resulting dispersion contained 12.5% solids, had a pH of 2.4 and a surface tension of 36.5 dynes/cm. This material was passed through a 1 cubic foot glass column packed with an activated weakly basic, gel-type, polyamine anionic exchange resin (Amberlite IRA-47, Rohm and Haas Co., Philadelphia, Pa.) at a rate of 120 pounds/hour. The ion exchanged product had a pH of 7.4 and a surface tension of 56 dynes/cm. The pH was then adjusted to about 3.8 to prevent deemulsification using 20% aqueous malonic acid and the solution further diluted with water to 2.5% solids. A wetting agent (sodium myristyl ether sulfate, an anionic surfactant termed Standapol ES-40 produced by Standard Chemical Products, Inc., 10% aqueous solution) was then added to reduce the surface tension to about 38.7 dynes/cm. The emulsion polymer thus produced was coated on to a biaxially oriented (biaxially stretched) and heat set polyethylene terephthalate film and then further over-coated with a thin substratum of gelatin. These procedures are well illustrated in the above Rawlins patent, Example 1. After coating, the doubly subbed film base was heat relaxed at 130° C. for about 2 minutes. The subbed film base was then coated with a standard photographic gelatino silver halide emulsion which was then given a test exposure followed by development in a standard developer solution for said silver halide element. Wet and dry anchorage of this resulting material was tested by the method described in D'Cruz, U.S. Pat. No. 3,545,972, Dec. 8, 1970 was excellent and rated as "0" in both cases. In comparison, a film base of polyethylene terephthalate, already biaxially oriented and heat set, was coated with the same subbing composition described above, but without the ion exchange treatment. The dispersion was diluted to 2.5% solid and wetting agent, solution (the same Standapol ES-40 described above) added to adjust surface tension to about 39 dynes/cm. The same gel sub and gelatino silver halide emulsion was applied thereon and the exposed and developed element given the same anchorage tests described in the above D'Cruz patent. Dry anchorage was rated as 0 but wet anchorage was rated as 5 which is almost complete adhesive failure.

EXAMPLE 4

Example 3 was repeated using an amine based intermediate basic ion exchange resin from the Barnstead Corp., Boston, Mass. (No. 31002). This resin was first activated by slurrying with a 5% NaOH solution followed by washing with distilled water to remove the excess NaOH. A subbing composition similar to Example 2, but with 90 vinylidene chloride/10 methyl acrylate/2 itaconic acid, was prepared. This dispersion, at 12.5% solids 35 dynes/cm surface tension and a pH of 3.0, was slurried for 2 hours in the ion exchange resin and filtered. The filtered emulsion had a surface tension of 53 dynes/cm and a pH of 9.0. The solids content was lowered to 2.5%, by adding water, the pH adjusted to 3.7 with 10% aqueous malonic acid and the surface tension adjusted to about 39 dynes/cm with the Standapol ES-40 solution described in Example 2. This material was coated on a biaxially oriented and heat set polyethylene terephthalate film support to achieve a coating weight of about 2–3 mg/dm$^2$. A gel layer was coated contiguously thereon, dried at 150° F. for about 15 seconds and the resulting coated film support was heat relaxed for about 1.5 minutes at 280° F. A photographic silver halide emulsion was applied next as described in Example 2 and a sample was exposed, developed and tested as described before. The wet anchorage was rated as 0 (Excellent) and the dry anchorage as 1 (good).

EXAMPLE 5

Example 3 was repeated using a gel-type, weakly basic anion exchange resin having tertiary amine functionalities on a cross-linked acrylic matrix (Amberlite IRA-68, Rohm and Haas Co.) and the emulsion subbing composition described therein. The wet and dry anchorage of the coated film base (which was prepared and coated as described in Example 2) was 0 or Excellent.

EXAMPLE 6

An emulsion polymer similar to that described in Example 3 was prepared and split into 3 portions. Portion 1 was treated with a weak acid cation exchange resin containing carbocylic functionalities within a cross-linked acrylic matrix (Amberlite IRC-84, Rohm & Haas Co.), Portion 2 with the anionic resin from Example 5 (Amberlite IRC-68, Rohm and Haas Co.), and Portion 3 first with IRC-84 and then IRC-68. All ion exchange treatments were with activated resins packed in a glass column. In each case, the exchange treated material was adjusted as regards % solids, pH and the surface tension as described in Example 2. Each portion was then coated on a sample of biaxially oriented (biaxially stretched) and heat-set polyethylene terephthalate film. After drying the subbing layer, and heat relaxing the coated film, an emulsion of gelatin containing a dye for visibility and formaldehyde hardener was applied thereon. After drying, the anchorage tests of Example 3 were applied with the following results.

| Portion | Treatment | Anchorage | |
|---|---|---|---|
| | | Wet | Dry |
| 1 | IRC-84 cationic | 3–4 | 1 |
| 2 | IRA-68, anionic | 1 | 1 |
| 3 | IRC-84 followed by IRA-68 | 0 | 1 |

EXAMPLE 7

Example 3 was repeated but using a nonionic exchange resin (a cross-linked aliphatic polymer, 20–50 mesh beads, with no ionically functional groups, Amberlite XAD-7, Rohm and Haas Co.). A subbing layer produced from this resin treated material produced poor wet and dry anchorage.

Several other emulsion polymers were produced having varying compositions as described in Rawlins, U.S. Pat. No. 3,443,950. Subbing layers produced from these materials, when treated with an anionic exchange resin or with a cationic exchange resin followed by an anionic exchange resin, all demonstrated remarkable adhesion properties when coated on dimensionally stable, bilaterally stretched, hydrophobic macromolecular film bases. This presents a clear and obvious advantage over the prior art, which must apply the subbing layer prior to bilateral stretching of the film base. Thus, any losses occurring during the stretching step can now be recovered by practicing our invention.

The subbing compositions of this invention are ideally suitable for the reception of gelatin coatings, e.g. gelatin subbing layers, non-halation layers and photographic emulsions. In addition to serving as substratum anchoring layers for photographic coatings, these layers can also be used for the drafting films of Van Stappen U.S. Pat. No. 2,964,423. They may also contain various pigments or dyes for various purposes. These layers may be applied to the film supports by any conventionally known means such as by dip or skim coating, coating with rollers or air knife, falling film or bar coating, etc. Suitable coating methods are well described in the prior art. Various coating aids and surfactants which are compatible with the emulsion polymer solution may be used if not deleterious to subsequently applied layers.

We claim:

1. A process of coating a dimensionally stable, hydrophobic, biaxially oriented thermoplastic resin film with an aqueous emulsion of a polymer containing from 35 to 96 weight percent vinylidene chloride, from 3.5 to 64.5 weight percent of an alkyl acrylate wherein the alkyl group contains from 1 to 10 carbon atoms, an alkyl methacrylate wherein the alkyl group contains from 1 to 10 carbon atoms, acrylonitrile, methacrylonitrile, vinyl chloride, or combinations thereof and from 0.5 to 25 weight percent of a carboxylic acid containing from 3 to 10 carbon atoms and having one carbon - carbon ethylenically unsaturated double bond wherein said dispersion has an initial pH of from about 2 to about 5 and which process comprises treating said dispersion with an anionic exchange resin sufficiently to raise the pH of the dispersion to above about 7.5, applying the thus treated dispersion to the film and drying the coated dispersion.

2. The process of claim 1 wherein the film is a polyester containing repeating units of the structure

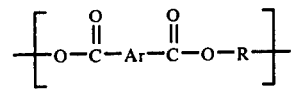

wherein R is an alkylene group of from 2 to 10 carbon atoms a cycloalkylene group of from 6 to 10 carbon atoms or an arylene group of from 6 to 20 carbon atoms and Ar is either phenylene or naphthylene, which film has been biaxially oriented from 1.5 to 5X in both directions.

3. The process of claim 2 wherein the polyester is polyethylene terephthalate.

4. The process of claim 3 wherein the dispersion contains from 1 to 30 weight percent of the polymer.

5. The process of claim 4 wherein the dispersion is cationically exchanged prior to being anionically exchanged.

6. The process of claim 5 wherein the polymer in the dispersion is a sequentially polymerized mixture of (a) 60 to 90 weight percent of a terpolymer of from 35 to 90 weight percent vinylidene chloride, 3.4 to 64.5 weight percent of an alkyl acrylate wherein the alkyl group contains from 1 to 4 carbon atoms and from 0.5 to 25 weight percent of itaconic acid and (b) from 10 to 40 weight percent of a polymer, one or more acrylate esters selected from the class consisting of alkyl acrylates wherein the alkyl group contains from 1 to 10 carbon atoms and alkyl methacrylates wherein the alkyl group contains from 1 to 10 carbon atoms.

7. A thermoplastic, biaxially oriented hydrophobic resin film support having a subbing composition coated thereon, said composition having been anionically exchanged as an aqueous emulsion so that the pH is raised from about 2 to 5 to above about 7.5, said composition comprising 35 to 96 weight percent vinylidene chloride, 3.5 to 64.5 weight percent of an alkyl acrylate, wherein the alkyl group contains from 1 to 10 carbon atoms, an alkyl methacrylate, wherein the alkyl group contains from 1 to 10 carbon atoms, acrylonitrile, methacrylonitrile, vinyl chloride, or mixtures thereof, and 0.5 to 25 weight percent of a carboxylic acid containing 3 to 10 carbon atoms and having at least one carbon to carbon ethylenically unsaturated double bond.

8. The article of claim 7 wherein said resin film support is polyethylene terephthalate.

9. The article of claim 7 wherein an organic acid and a wetting agent are added to the anionically-exchanged subbing composition.

10. The article of claim 9 wherein the organic acid is malonic acid and the wetting agent is sodium myristyl either sulfate.

* * * * *